United States Patent Office 3,516,979
Patented June 23, 1970

3,516,979
HETEROGENOUS 1:2 METAL COMPLEXES
OF MONOAZO DYES
Jacky Dore and Reinhard Neier, Basel, Switzerland, assignors to Sandoz Ltd. (also known as Sandoz A.G.), Basel, Switzerland
No Drawing. Filed July 7, 1966, Ser. No. 563,361
Claims priority, application Switzerland, July 9, 1965, 9,669/65
Int. Cl. C09b 45/14, 45/16, 45/20
U.S. Cl. 260—145                     8 Claims

ABSTRACT OF THE DISCLOSURE

Heterogeneous 1:1 metal complexes of monoazo dyes, at least one of which is a phenyl-azo-naphthalene dye the naphthalene nucleus of which bears an amino group in one of the 5-, 6-, 7- and 8-positions and also bears the sole sulphonic acid group in the complexes, are useful for dyeing leather, animal fibers and polyamide fibers and for pigmenting plastics and resins.

This invention relates to a process for the production of 1:2 metal complex dyes, which consists of reacting with at least 1 mol of a chromium- or cobalt-yielding agent $n$ moles of a monoazo dye of formula

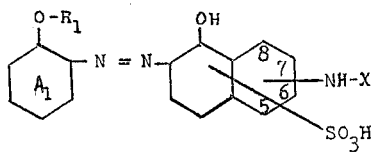

and (2-$n$) moles of one or more monoazo dyes of formula

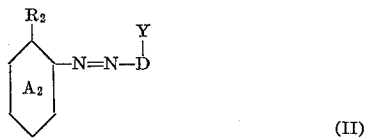

(II)

where $n$ stands for a number from 0.5 to 1.5, preferably one between 0.8 and 1.2, $R_1$ for hydrogen or lower alkyl, $R_2$ for hydroxy, carboxy or lower alkoxy, X for hydrogen, lower alkyl (which may be substituted) or mononuclear aryl (which may be substituted), D—Y for the radical of a coupling component which is free from water-solubilising groups and couples in the adjacent position to Y, and Y for —OH, —NH$_2$, —NH-alkyl or —NH-aryl; and where the nuclei $A_1$ and $A_2$ may bear further substituents, except sulphonic acid or carboxylic acid groups, and the group —NH—X is in one of the positions 5, 6, 7 and 8 and bears no water-solubilising substituents.

The monoazo dyes of Formula I can be produced by coupling the diazo compound of an amine of formula

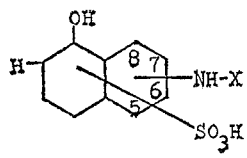

(III)

with a coupling component of formula

Examples of substituents which may be present on the nucleus $A_1$ are halogen atoms, such as chlorine, bromine and fluorine; lower alkyl or alkoxy groups which may be substituted or unsubstituted, such as methyl, ethyl, isopropyl, n-propyl, n-butyl, tert.butyl, tert.amyl, methoxy, ethoxy, n-butoxy; nitro or acylamino groups, e.g. carbonylamino or sulphonylamino groups, such as acetylamino, propionylamino, butyrylamino, benzoylamino, 4-chlorobenzoylamino, methoxycarbonylamino, ethoxycarbonylamino, methylsulphonylamino, ethylsulphonylamino, phenylsulphonylamino, 2- or 4-methylphenylsulphonylamino; carbonyl or sulphonyl groups, such as alkylcarbonyl or alkylsulphonyl groups, e.g. acetyl, propionyl, methylsulphonyl, ethylsulphonyl; arylcarbonyl or arylsulphonyl, such as benzoyl, phenylsulphonyl, 2- or 4-methylphenylsulphonyl; cyano groups; and substituted or unsubstituted sulphonic acid amide groups, such as —SO$_2$—NH$_2$, —SO$_2$—NH—CH$_3$, —SO$_2$—N(CH$_3$)$_2$,

—SO$_2$NH—CH$_2$—CH$_2$—OH

—SO$_2$—NH—CH$_2$—CH$_2$—CH$_2$—O—CH$_3$

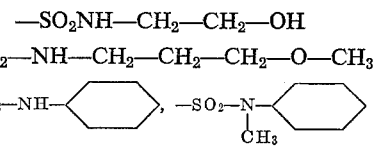

Preferred diazo components of Formula III are, for example, 1-amino-2-hydroxy-4- or -5-nitrobenzene, 1-amino-2-hydroxy-3,5-dinitrobenzene, 1-amino-2-hydroxy-3-chloro- or -3-acetylamino-5-nitrobenzene, 1-amino-2-hydroxy-5-chloro-4- or -3-nitrobenzene, 1-amino-2-hydroxy-5-methyl- or -5-chlorobenzene, 1-amino-2-hydroxy-5-methyl-3-nitrobenzene, 1-amino-2-hydroxy-3,5-dichloro- or -3,5,6-trichlorobenzene, 1-amino-2,5-dimethoxybenzene, 1-amino-2,5-dimethoxy-4-nitrobenzene.

Examples of suitable coupling components of Formula IV are 1-hydroxy-6-amino-, -6-methylamino-, -6-phenylamino- or -6-(4'-methyl- or -methoxy-phenylamino)-naphthalene-3-sulphonic acid, 1-hydroxy-7-amino, 7-methylamino-, -7-phenylamino- or 7-(2',4',6'-trimethylphenylamino)-naphthalene-3-sulphonic acid, 1-hydroxy-5-amino- or -5-phenylaminonaphthalene-3-sulphonic acid, 1-hydroxy-8-amino- or -8-phenylaminonaphthalene-5-sulphonic acid.

The monoazo dyes of Formula II can be produced by coupling the diazo compound of an amine of formula

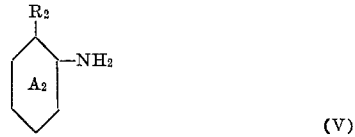

(V)

with a coupling component of formula

(VI)

in the adjacent position to Y.

The ring $A_2$ may bear the same substituents as the ring $A_1$. The preferred diazo components of Formula V are the aforenamed, and additionally 2-aminobenzene-1-carboxylic acid, 2-amino-5-nitro- or -4-nitrobenzene-1-carboxylic acid.

The following are examples of suitable coupling components of Formula VI: 1-hydroxy-4-methyl- or -4-tert.-butyl- or -4-acetylaminobenzene, 1,3-dihydroxy- or 1,3-diaminobenzene, 1-amino-3-hydroxybenzene, 2-hydroxynaphthalene, 2-hydroxy-8-amino-, -8-acetylamino-, -8-methylsulphonylamino-, -8-ethoxycarbonylamino- or -8-(2'-hydroxyethoxycarbonylamino)-naphthalene, 2-aminonaphthalene, 2-phenylamino- or 2-(3'-chlorophenylamino)-naphthalene, 1-hydroxy-4-methoxynaphthalene, 1-hydroxy-5,8-dichloronaphthalene, 2-hydroxynaphthalene- 3-carboxylic acid-phenylamide, -(2'-methylphenylamide), -(2'-methoxyphenylamide), -(2',5'-dimethoxyphenylamide), -(4'-chloro-2'-methylphenylamide) or -(2',4'-dimethoxy-5'-chlorophenylamide), 5-pyrazolones or 5-aminopyrazoles such as 1-phenyl-3-methyl-5-pyrazolone, 1-(3'-chlorophenyl)-, 1-(2',5'-dichlorophenyl)- or 1-(3'-cyanophenyl)-3-methyl-5-pyrazolone, 1-phenyl-3-methyl-5-aminopyrazole, acetoacetylaminobenzene, 1-acetoacetylamino-2-methoxybenzene, 1-acetoacetylamino-2-ethylhexane and barbituric acid.

The monoazo dyes are converted into their metal complex compounds by metallisation with chromium or cobalt compounds. The metallising reaction is carried out preferably in one stage in aqueous solution or in an organic medium, for instance formamide, or in the concentrated aqueous solution of an alkali metal salt of a lower aliphatic monocarboxylic acid at temperatures of 50° C. to about 130° C. It is of advantage to allow an amount of metal-yielding agent containing less than two but at least one gram equivalent of metal to act upon two moles of the monoazo dye.

Examples of suitable chromium compounds are chromic fluoride, chromic sulphate, chromic formate, chromic acetate, chromic potassium sulphate and chromic ammonium sulphate. The chromates as well, for instance sodium or potassium chromate or bichromate, are highly suitable for the metallisation of these monoazo dyes. With the latter the reaction is carried out to best advantage in a strongly caustic-alkaline medium, to which reducing substances may be added if necessary.

Examples of suitable cobalt compounds are cobaltous formate, cobaltous acetate and cobaltous sulphate. If the metallising reaction is conducted in the concentrated aqueous solution of the alkali metal salt of a lower aliphatic monocarboxylic acid, water-insoluble metal compounds such as cobalt hydroxide and cobalt carbonate can be used.

It is of special advantage to carry out the metallising reaction in an aqueous or alkaline medium to which the metal compounds are added in the presence of compounds which maintain the metals dissolved in complex combination in caustic alkaline solution, for example tartaric, citric, lactic or salicylic acid.

Alternatively, metallisation can be carried out in two stages, the 1:1 metal complex compound of one of the monoazo dyes of Formula I or II being produced first and this subsequently reacted with one of the metallisable monoazo dyes of Formula I or II. In this case a suitable procedure is to react the metallisable monoazo dyes, preferably those of Formula I which contain one sulphonic acid group, with an excess of a salt of the trivalent chromium compound, such as chromium formate, sulphate or fluoride, in an acid medium at the boil or, if necessary, at temperatures above 100° C. To convert the dyes, which are free from metal and sulphonic acid groups dyes, which are free from metal and sulphonic acid groups, in the 1:1 complexes, it is generally advisable to adopt the known metallising method, for example in the presence of organic solvents such as alcohols or formamide.

As a rule it is advantageous to react the 1:1 metal complexes further in the moist paste form as obtained on isolation, without intermediate drying.

The reaction of the 1:1 metal complexes with the metal-free dyes is best carried out in aqueous, neutral to weakly alkaline medium in an open or enclosed vessel at normal or elevated temperature, e.g. from 50° to 120° C. Generally it is advisable to react as nearly as possible equivalent amounts of the metal-containing 1:1 complex and the metal-free dye, the molecular ratio of the metal-free dye and the 1:1 complex being preferably about 0.90:1 to 1:0.90.

The resulting metal complex compounds are precipitated from the aqueous medium by the addition of salt, if preferred after previously running the organic metallising solution into water, and are then filtered off, washed if necessary and dried.

The final chromium- or cobalt-containing azo dyes are heterogeneous complexes in which essentially one metal atom is bound to two different molecules of the monoazo compounds. In aqueous solution they are suitable for dyeing leather and for dyeing, padding and printing animal fibres, e.g. wool and silk, and polyamide fibers. They are also well soluble in polar solvents, for instance acetone, alcohol and ethyl acetate, and therefore can be used for dyeing and printing leather and for pigmenting plastics and resins in solution in organic solvents, in which materials they give blue, grey, brown or green shades of good light and wet fastness. They are also suitable for the pigmentation of certain surface coatings.

Wool, silk and polyamide fibres are dyed or printed with these dyes preferably from a weakly acid, neutral or weakly alkaline medium, for example in the presence of acetic acid, ammonium sulphate, or sodium metaphosphate. Dyeing can be carried out in an acetic acid to neutral bath in the presence of levelling agents, examples of which are polyoxethylated fatty amines and mixtures of these and alkylpolyglycol ethers; the general temperature range for dyeing is 90° to 130° C., e.g. 95–108° C. or more particularly 98–102° C. for wool, and 95–130° C., e.g. 98–102° C. at normal and 120–130° C. at excess pressure, for polyamide fibres.

The dyeings have good fastness to light and wet tests such as washing, milling, perspiration, water and sea water, and to rubbing, acids, e.g. acetic acid, alkalis, e.g. sodium carbonate, dry cleaning, pressing, bleaching, stoving, carbonising and cross dyeing.

In German "Auslegeschrift" No. 1,202,416 Example 2, a 1:2 chromium complex dye is described which can be obtained by reacting a chromium compound with two monoazo dyes of the formulae

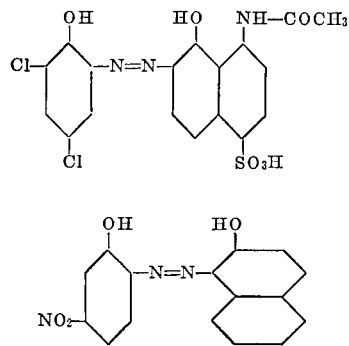

in the molecular ratio 1:1. Dyed on wool, this dye shows poor wet fastness properties, whereas the 1:2 metal complex dyes of the present invention give wool dyeings of appreciably better fastness to washing, water and perspiration.

In the following examples the parts and percentages are by weight and the temperatures in degrees centigrade.

EXAMPLE 1

A mixture of 5.1 parts of the monoazo dye obtained by coupling diazotised 2-amino-1-hydroxy-4-chloro-6-nitrobenzene with 1-hydroxy-6-phenylaminonaphthalene-3-sulphonic acid in alkaline medium, 3.1 parts of the monoazo dye obtained by coupling diazotised 2-amino-1-hydroxy-5-nitrobenzene with 2-aminonaphthalene in acid medium, 2.8 parts of cobalt sulphate (CoSO$_4$·7H$_2$O) and 50 parts of formamide is stirred for 1 hour at 100° until the metal-free starting dyes are completely transformed into metal complex dyes. The reaction mixture is diluted with 200 parts of water and an addition of sodium chloride, on which the dyes settle out from the dark medium. They are isolated, purified by dissolving in water in the presence of sodium hydroxide solution, precipitation with sodium chloride and filtration, and are then dried and ground. The final product is a dark powder which dissolves in water with a blue coloration and dyes wool, silk, leather and polyamide fibres in blue shades. Being soluble in polar organic solvents (ketones, alcohols and alkylcarboxylic acid esters), it is suitable for dyeing cellulose acetate and acrylic or other synthetic fibres in the mass. It can also be used for the pigmentation of surface coatings in blue shades, for example vinyl and nitrocellulose lacquers.

Application Example A 1 part of the cobalt-containing dye disclosed in Example 1 is dissolved in 4000 parts of water at 40–50°. 100 parts of previously wetted out wool are entered into the bath, and after the addition of 2 parts of ammonium sulphate in 10% aqueous solution it is raised to the boil in 30 minutes. Dyeing is continued for a further 45 minutes at this temperature, after which the wool is removed, rinsed with water and dried. A blue dyeing is obtained which shows very good fastness to light, washing, milling and perspiration.

Nylon and other polyamide fibres can also be dyed by this method.

Application Example B

A solution is prepared with 20 parts of a vinyl chloride/vinyl acetate copolymer, e.g. Vinylite VMCH, 70 parts of methylethyl ketone and 10 parts of ethylene glycol. A solution of 0.5 part of the dye of Example 1 in 10 parts of the same lacquer is added, and the coating composition is finally diluted with 25 parts of a 1:1 mixture of methylethyl ketone and cyclohexanone. It is applied to aluminium foil and air dried to give a blue coating which shows good adhesive power, good resistance to fats, wet rubbing and top finishes, and excellent light fastness.

Application Example C 100 parts of cellulose acetate with a content of 54–55% splittable acetic acid are mixed with 300 parts of solvent, for example a mixture of 275 parts of acetone and 25 parts of methanol, and after continued stirring the solution is left overnight to swell. Next day 1 part of the dye obtained as described in Example 1 is dissolved in 60 parts of the same solvent. This solvent is added to the cellulose acetate solution with constant stirring until 60 parts of the solvent have evaporated. The solution is passed through a cotton filter and a filter press, after which it is spun in the same way as undyed cellulose acetate to form blue filaments.

EXAMPLE 2

A mixture of 5.1 parts of the monoazo dye obtained by coupling diazotised 2-amino-1-hydroxy-4-chloro-6-nitrobenzene with 1-hydroxy-6-phenylamino-naphthalene-3-sulphonic acid in alkaline medium, 5 parts of ammonium chrome alum $[NH_4Cr(SO_4)_2.12H_2O]$ and 60 parts of ethylene glycol is heated at 130° for a few hours until the metal-free dye is completely converted into the chromium complex. On cooling to 100°, 3.1 parts of the dye obtained with diazotised 2-amino-1-hydroxy-5-nitrobenzene and 2-hydroxynaphthalene are added, together with 30 parts of formamide. Stirring is continued for a further hour at 100°, after which time the metal-free dye is no longer indicated in the reaction mixture. 200 parts of water and 30 parts of sodium chloride are added, causing it to settle out. It is isolated and purified by dissolving in warm water with sodium hydroxide solution and precipitation with sodium chloride, and subsequently filtered off, dried and ground. It is then a dark powder which dissolves in water to give blue solutions and dyes wool, silk, leather and polyamide fibres in blue shades. As it is soluble in polar organic solvents' it can be used for the mass dyeing of cellulose acetate, acrylic fibres and other organic synthetic materials, and in addition for the pigmentation of surface coatings, such as vinyl and nitrocellulose lacquers' in navy blue tones.

EXAMPLE 3

A mixture of 5.1 parts of the monoazo dye sodium 1 - hydroxy-2-(2'-hydroxy-5'-chloro-3'-nitrophenylazo-6-phenylaminonaphthalene-3-sulphonate, 1.5 parts of the dye 1 - (2' - hydroxy-4'-nitrophenylazo)-2-hydroxynaphthalene and 1.9 parts of the dye 1-(2'-hydroxy-4'-nitrophenylazo)-2-phenylaminonaphthalene is metallised with 2.8 parts of cobalt sulphate heptahydrate by the procedure of Example 1. A dye is obtained which dissolves in water with a navy blue coloration and dyes wool, silk, leather and polyamide fibres in navy blue shades. It is soluble in organic polar solvents (ketones, alcohols and alkylcarboxylic acid esters) and therefore is suitable for the mass dyeing of organic synthetic materials, such as cellulose acetate and acrylic fibres. It can also be used for pigmenting surface coatings, such as vinyl and nitrocellulose lacquers, in navy blue tones.

The following table contains particulars of further 1:2 heterogeneous metal complex dyes conforming to the present invention. They are distinguished therein, in columns (I) to (IV) respectively, by the dyes of Formulae I and II used for their production, the metal used for metallisation, and the shade of the dyeing on wool.

| Ex. No. | Dye with HO₃S group (I) | Number of moles of dye in column I | Dye without HO₃S group (II) | Number of moles of dye in column II | Metal (III) | Shade of dyeing on wool (IV) |
|---|---|---|---|---|---|---|
| 4 | 2-amino-1-hydroxy-5-nitrobenzene→1-hydroxy-6-phenylaminonaphthalene-3-sulphonic acid. | 1 | 2-amino-1-hydroxy-5-nitrobenzene→2-phenylaminonaphthalene. | 1 | Co | Blue. |
| 5 | do | 1 | 2-amino-1-hydroxy-5-nitrobenzene→2-hydroxynatphthalene. | 1 | Co | Violet. |
| 6 | do | 1 | do | 1 | Cr | Blue. |
| 7 | 2-amino-1-hydroxy-4-chloro-6-nitrobenzene →1-hydroxy-6-phenylaminonapththalene-3-sulphonic acid. | 1 | 2-amino-1-hydroxy-5-nitrobenzene→2-phenylaminonaphthalene. | 1 | Co | Do. |
| 8 | do | 1 | 2-amino-1-hydroxy-5-nitrobenzene→2-hydroxynaphthalene-3-carboxylic acid phenylamide. | 1 | Co | Do. |
| 9 | 2-amino-1-hydroxy-4-chloro-6-nitrobenzene →1-hydroxy-6-(4'-methoxy)-phenyl-aminonaphthalene-3-sulphonic acid. | 0.8 | 2-amino-1-hydroxy-4-chlorobenzene→2-hydroxynaphthalene. | 1.2 | Cr | Do. |
| 10 | 2-amino-1-hydroxy-4-chlorobenzene→1-hydroxy-6-(4'-methoxy)-phenylamino-naththalene-3-sulphonic acid. | 1 | 2-amino-1-hydroxy-5-nitrobenzene→2-hydroxynaphthalene. | 1 | Cr | Do. |
| 11 | 2-amino-1-hydroxy-3,4,6-trichlorobenzene →1-hydroxy-8-phenylaminonaphthalene-5-sulphonic acid. | 1 | 2-amino-1-hydroxy-5-nitrobenzene→2-phenylaminonapththalene. | 1 | Co | Blue-grey. |
| 12 | do | 1 | 2-amino-1-hydroxy-5-nigrobenzene→2-hydroxynaphthalene. | 1 | Cr | Blue. |
| 13 | 2-amino-1-hydroxy-4-methyl-6-nitrobenzene →1-hydrosy-6-phenylaminonaphthalene-3-sulphonic acid. | 1 | do | 1 | Cr | Do. |
| 14 | 2-amino-1-hydroxy-4-chloro-5-nitrobenzene →1-hydroxy-6-phenylaminonaphthalene-3-sulphonic acid. | 1.2 | 2-amino-1-hydroxy-4-chlorobenzene→2-hydroxynaphthalene. | 0.8 | Cr | Do. |

| Ex. No. | Dye with HO₃S group (I) | Number of moles of dye in column I | Dye without HO₃S group (II) | Number of moles of dye in column II | Metal (III) | Shade of dyeing on wool (IV) |
|---|---|---|---|---|---|---|
| 15 | 2-amino-1-hydroxy-4,6-dichlorobenzene →1-hydroxy-6-phenylaminonaphthalene-3-sulphonic acid. | 1 | 2-amino-1-hydroxy-5-nitrobenzene→2-hydroxynaphthalene. | 1 | Cr | Do. |
| 16 | 2-amino-2-hydroxy-4-chlorobenzene→1-hydroxy-6-phenylaminonaphthalene-3-sulphonic acid. | 0.8 | ___do___ | 1.2 | Cr | Do. |
| 17 | 2-amino-1-hydroxy-4-chlorobenzene→1-hydroxy-7-phenylaminonaphthalene-3-sulphonic acid. | 1 | ___do___ | 1 | Cr | Grey. |
| 18 | ___do___ | | 1-aminobenzene-2-carboxylic acid→3-methyl-1-phenyl-5-pyrazolone. | 1 | Cr | Do. |
| 19 | 2-amino-1-hydroxy-4,6-dichlorobenzene→1-hydroxy-6-aminonaphthalene-3-sulphonic acid. | 1 | 1-amino-4-nitrobenzene-2-carboxylic acid→2-hydroxynaphthalene-3-carboxylic acid (4'-chloro-2'-methylphenylamide). | 1 | Cr | Do. |
| 20 | 2-amino-1-hydroxy-4,6-dichlorobenzene→1-hydroxy-5-phenylaminonaphthalene-3-sulphonic acid. | 1 | 2-amino-1-hydroxy-5-nitrobenzene→1-phenyl-3-methyl-5-aminopyrazole. | 1 | Cr | Brown. |
| 21 | 2-amino-1-hydroxy-4-chloro-5-nitrobenzene→1-hydroxy-6-(4'-methoxy)-phenylamino-naphthalene-3-sulphonic cid. | 1.2 | 2-amino-1-hydroxy-4-nitrobenzene→acetoacetylaminobenzene. | 0.8 | Cr | Dark green. |
| 22 | 2-amino-1-hydroxy-4-chlorobenzene→1-hydroxy-8-ethylaminonaphthalene-3-sulphonic acid. | 1 | 2-amino-1-hydroxy-5-nitrobenzene→barbituric acid. | 1 | Cr | Violet-brown. |
| 23 | 2-amino-1-hydroxy-4-chloro-5-nitrobenzene→1-hydroxy-6-methylaminonaphthalene-3-sulphonic acid. | | 2-amino-1-hydroxy-5-nitrobenzene→2-methylaminonaphthalene. | 1 | Cr | Blue. |
| 24 | 2-amino-1-hydroxy-4,6-dichlorobenzene→1-hydroxy-8-phenylaminonaphthalene-5-sulphonic acid. | 1 | 2-amino-1-hydroxy-4-nitrobenzene→1-acetoacetylamino-2-ethylhexane. | 1 | Co | Green. |
| 25 | 2-amino-1-hydroxy-4-chloro-5-nitrobenzene→1-hydroxy-6-(4'-methoxy)-phenylamino-naphthalene-3-sulphonic acid. | 1 | 2-amino-1-hydroxy-4,6-dichlorobenzene→2-hydroxynaphthalene. | 1 | Cr | Blue. |
| 26 | 1-amino-2,5-dimethoxybenzene→1-hydroxy-6-phenylaminonaphthalene-3-sulphonic acid. | 1 | ___do___ | 1 | Cr | Do. |
| 27 | 2-amino-1-hydroxy-5-nitrobenzene→1-hydroxy-6-phenylaminohaphthalene-3-sulfonic acid. | 1 | 1-amino-2,5-dimethoxybenzene→2-hydroxynaphthalene. | 1 | Cr | Do. |
| 28 | 4-tert.-butyl-1-hydroxy-2-aminobenzene→1-hydroxy-6-phenylaminonaphthalene-3-sulphonic acid. | 1 | 2-amino-1-hydroxy-5-nitrobenzene→2-hydroxynaphthalene. | 1 | Cr | Do. |
| 29 | 1-amino-4-bromo-2,5-dimethoxybenzene→1-hydroxy-6-(4'-methoxy)-phenylamino-naphthalene-3-sulfonic acid. | 1 | 2-amino-1-hydroxy-3,4,6-trichlorobenzene→2-hydroxynaphthalene. | 1 | Cr | Do. |
| 30 | 2-amino-1-hydroxy-5-nitrobenzene→1-hydroxy-6-phenylaminonaphthalene-3-sulphonic acid. | 0.5 | { 2-amino-1-hydroxy-5-nitrobenzene→2-phenylaminonaphthalene and 2-amino-1-hydroxy-5-nitrobenzene→2-hydroxynaphthalene. | 0.5 / 1 | Cr | Do. |
| 31 | ___do___ | 1 | { 2-amino-1-hydroxy-5-nitrobenzene→2-phenylaminonaphthalene and 2-amino-1-hydroxy-4-chlorobenzene→2 hydroxynaphthalene. | 0.5 / 0.5 | Cr | Do. |
| 32 | 2-amino-1-hydroxy-4-chloro-5-nitrobenzene→1-hydroxy-6-phenylaminonaphthalene-3-sulphonic acid. | 0.8 | 2-amino-1-hydroxy-4-chlorobenzene→2-hydroxynaphthalene. | 1.2 | Cr | Do. |
| 33 | 2-amino-1-hydroxy-4-chloro-5-nitrobenzene→1-hydroxy-6-(4'-methoxy)-phenylamino-naphthalene-3-sulphonic acid. | 0.5 | { 2-amino-1-hydroxy-5-nitrobenzene→2-hydroxynaphthalene and 2-amino-1-hydroxy-4-chlorobenzene→2-hydroxynaphthalene. | 0.5 / 1 | Cr | Do. |
| 34 | ___do___ | 1 | 2-amino-1-hydroxy-5-nitrobenzene→2-hydroxynaphthalene. | 1 | Co | Do. |
| 35 | 2-amino-1-hydroxy-4,6-dinitrobenzene→1-hydroxy-6-(4'-methoxy)-phenylamino-naphthalene-3-sulphonic acid. | 1 | { 2-amino-1-hydroxy-5-nitrobenzene→2-hydroxynaphthalene and 2-amino-1-hydroxy-4-chlorobenzene→2-hydroxynaphthalene. | 0.5 / 0.5 | Cr | Do. |
| 36 | ___do___ | 1 | 2-amino-1-hydroxy-3,4,6-trichlorobenzene→2-hydroxynaphthalene. | 1 | Cr | Do. |
| 37 | ___do___ | 1 | { 2-amino-1-hydroxy-4,6-dichlorobenzene→2-hydroxynaphthalene and 2-amino-1-hydroxy-4-chlorobenzene→2-hydroxynaphthalene. | 0.5 / 0.5 | Cr | Do. |
| 38 | 2-amino-1-hydroxy-5-nitrobenzene→1-hydroxy-6-phenylaminonaphthalene-3-sulphonic acid. | 1.2 | 2-amino-1-hydroxy-4-chlorobenzene→2-hydroxynaphthalene. | 0.8 | Co | Violet. |
| 39 | ___do___ | 1.2 | ___do___ | 0.8 | Cr | Blue. |

EXAMPLE 40

A mixture of 3.2 parts of the monoazo dye produced by coupling diazotised 1-aminobenzene-2-carboxylic acid with 1-phenyl-3-methyl-5-pyrazolone in alkaline medium, 5 parts of potassium chrome alum[KCr(SO₄)₂·12H₂O] and 40 parts of formamide is heated at 120° for 1 hour until the metal-free starting dye is completely transformed into the 1:1 metal complex. Then 20 parts of formamide and 5.1 parts of the monoazo dye obtained by coupling diazotised 2-amino-1-hydroxy-4-chloro-5-nitrobenzene with 1-hydroxy-6-phenylaminonaphthalene-3-sulphonic acid in aikaline medium are added. Stirring is continued for 2 hours at 120° until this second metal-free monoazo dye is no longer indicated. When this is the case, 200 parts of water and 45 parts of soidum chloride are added, on which the final dye settles out. It is purified dissolving in 4% sodium hydroxide solution, precipitation with sodium chloride and filtration. It dyes wool in green shades.

Formulae of representative dyes of the foregoing examples are as follows:

EXAMPLE 30

The 1:2 chromium mixed complex of 0.5 mol of the azo compound of the formula

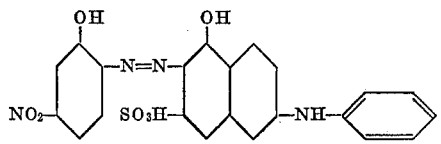

and of a mixture of 0.5 mol of the azo compound of the formula

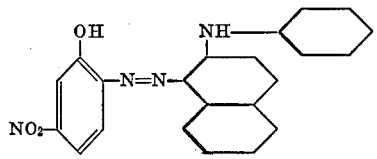

and 1 mol of the azo compound of the formula

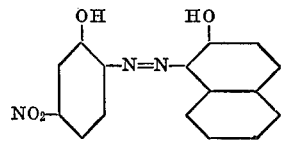

EXAMPLE 31

The 1:2 chromium mixed complex of 1 mol of the azo compound of the formula

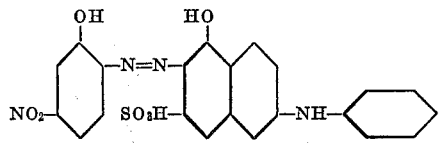

and of a mixture of 0.5 mol of the azo compound of the formula

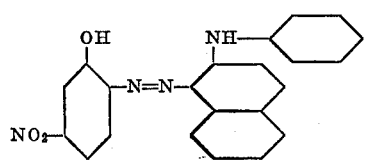

and 0.5 mol of the azo compound of the formula

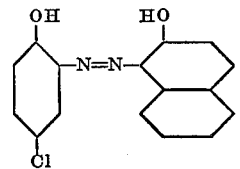

EXAMPLE 32

The 1:2 chromium mixed complex of 0.8 mol of the azo compound of the formula

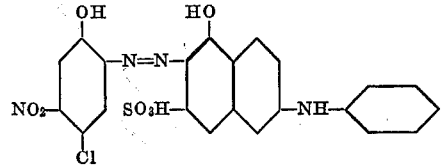

and a mixture of 0.6 mol of the azo compound of the formula

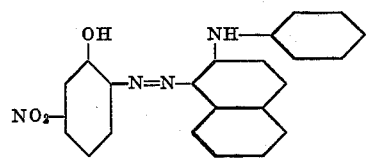

and 0.6 mol of the azo compound of the formula

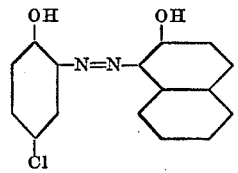

EXAMPLE 33

The 1:2 chromium mixed complex of 0.5 mol of the azo compound of the formula

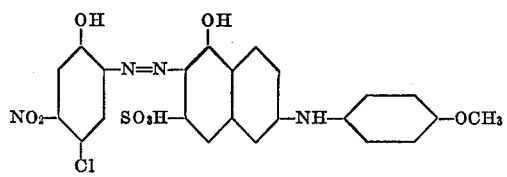

and of a mixture of 0.5 mol of the azo compound of the formula

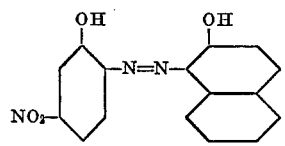

and 1 mol of the azo compound of the formula

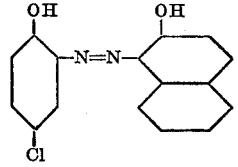

EXAMPLE 34

The 1:2 chromium mixed complex of 1 mol of the azo compound of the formula

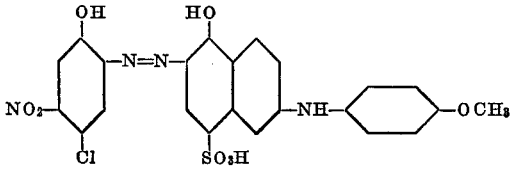

and 1 mol of the azo compound of the formula

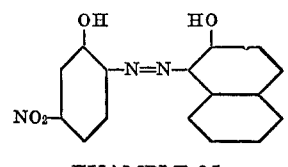

EXAMPLE 35

The 1:2 chromium mixed complex of 1 mol of the azo compound of the formula

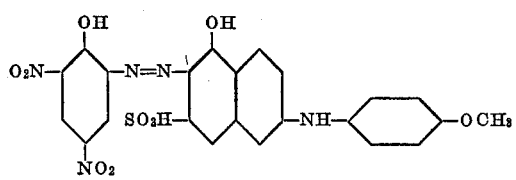

and of a mixture of 0.5 mol of the azo compound of the formula

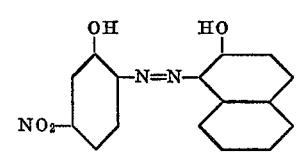

and 0.5 mol of the azo compound of the formula

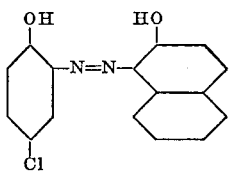

EXAMPLE 36

The 1:2 chromium mixed complex of 1 mol of the azo compound of the formula

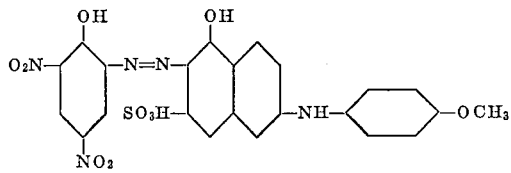

and of a mixture of 0.5 mol of the azo compound of the formula

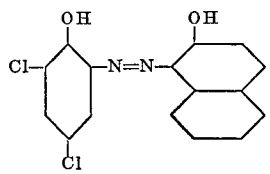

and 0.5 mol of the azo compound of the formula

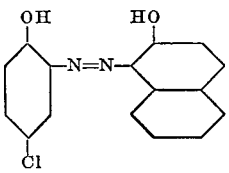

Having thus disclosed the invention what we claim is:
1. A 1:1 metal complex dye of $n$ moles of a monoazo dye of the formula

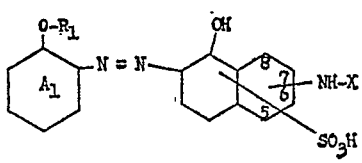

and (2–$n$) moles of one or more monoazo dyes of the formula

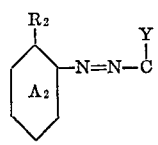

wherein:
$n$ is a number from 0.5 to 1.5, inclusive;
$R_1$ is a member selected from the group consisting of hydrogen and lower alkyl;
$R_2$ is a member selected from the group consisting of hydroxy, carboxy and lower alkoxy;
X is a member selected from the group consisting of phenyl, p-tolyl, p-methoxyphenyl and 2,4,6-trimethylphenyl;
D—Y is the radical of a coupling component free from water-solubilizing groups and which is coupled in a position adjacent to Y;
Y is a member selected from the group consisting of hydroxy, primary amino, phenylamino, m-chlorophenylamino and acetoacetylamino;
—NH—X is in one of the positions 5, 6, 7 and 8; and each of nuclei $A_1$ and $A_2$, otherwise free from sulfonic acid and carboxylic acid groups, is either further unsubstituted or is further substituted, and substituent being a member selected from the group consisting of chloro, bromo, fluoro, lower alkyl, lower alkoxy, nitro, acetylamino, propionylamino, butyrylamino, benzylamino, 4-chlorobenzoylamino, methoxycarbonylamino, ethoxycarbonylamino, methylsulphonylamino, ethylsulphonylamino, phenylsulphonylamino, 2 - methylphenylsulphonylamino, 4-methylphenylsulphonylamino, acetyl, propionyl, methylsulphonyl, ethylsulphonyl, benzoyl, phenylsulphonyl, 2-methylphenylsulphonyl, 4-methylphenylsulphonyl, cyano, —$SO_2$—$NH_2$, $SO_2$—NH—$CH_3$, —$SO_2$—N($CH_3$)$_2$,

—$SO_2NH$—$CH_2$—$CH_2$—OH

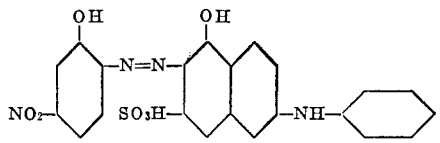

and

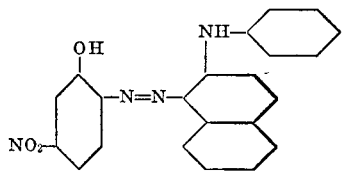

2. The 1:2 chromium mixed complex according to claim 1 of 0.5 mol of the azo compound of the formula

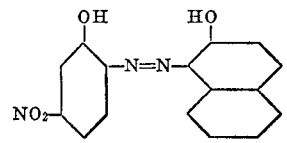

and of a mixture of 0.5 mol of the azo compound of the formula

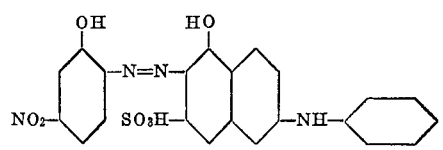

and 1 mol of the azo compound of the formula

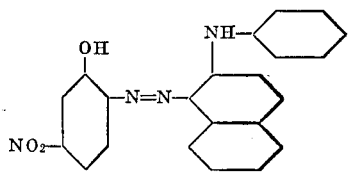

3. The 1:2 chromium mixed complex according to claim 1 of 1 mol of the azo compound of the formula

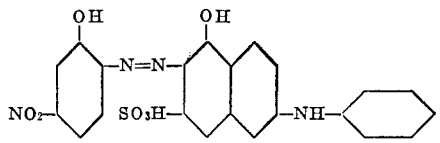

and of a mixture of 0.5 mol of the azo compound of the formula

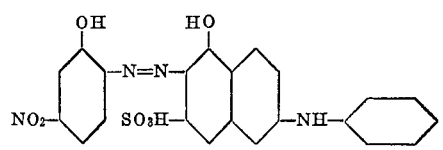

and 0.5 mol of the azo compound of the formula

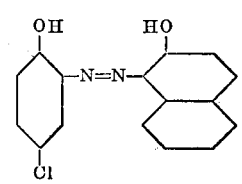

4. The 1:2 chromium mixed complex according to claim 1 of 0.8 mol of the azo compound of the formula

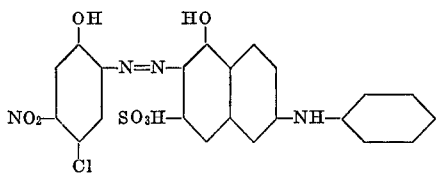

and of a mixture of 0.6 mol of the azo compound of the formula

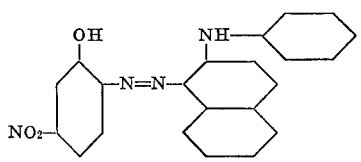

and 0.6 mol of the azo compound of the formula

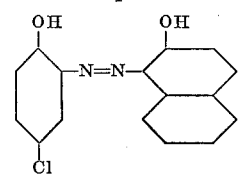

5. The 1:2 chromium mixed complex according to claim 1 of 0.5 mol of the azo compound of the formula

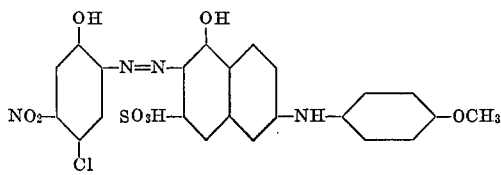

and of a mixture of 0.5 mol of the azo compound of the formula

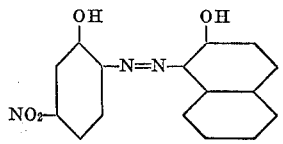

and 1 mol of the azo compound of the formula

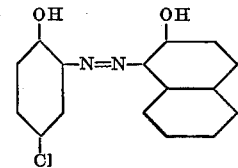

6. The 1:2 chromium mixed complex according to claim 1 of 1 mol of the azo compound of the formula

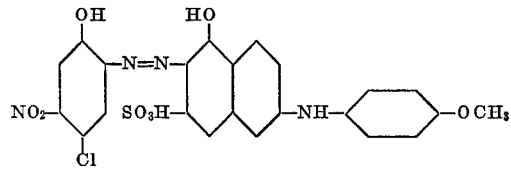

and 1 mol of the azo compound of the formula

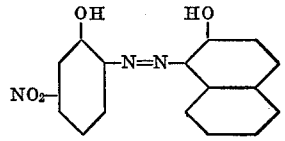

7. The 1:2 chromium mixed complex according to claim 1 of 1 mol of the azo compound of the formula

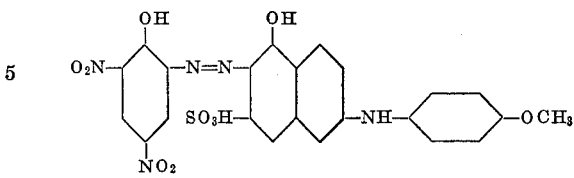

and of a mixture of 0.5 mol of the azo compound of the formula

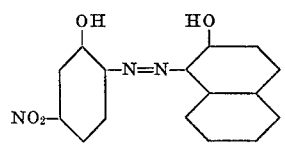

and 0.5 mol of the azo compound of the formula

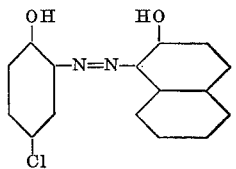

8. The 1:2 chromium mixed complex according to claim 1 of 1 mol of the azo compound of the formula

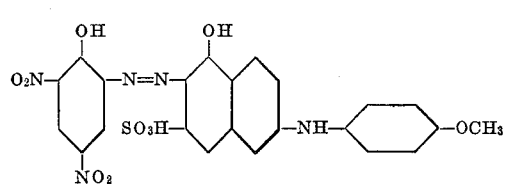

and of a mixture of 0.5 mol of the azo compound of the formula

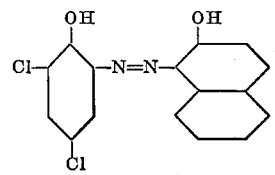

and 0.5 mol of the azo compound of the formula

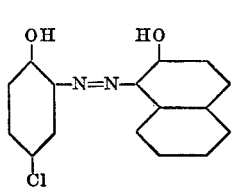

References Cited

UNITED STATES PATENTS

| | | | |
|---|---|---|---|
| 1,989,567 | 1/1935 | Straub et al. | 260—145 |
| 2,012,779 | 8/1935 | Straub et al. | 260—145 |
| 3,299,039 | 1/1967 | Moiso et al. | 260—145 |

FLOYD D. HIGEL, Primary Examiner

U.S. Cl. X.R.

8—4, 13, 42, 43, 63, 71; 106—288, 302; 117—138.8, 143, 152; 260—37, 147, 151, 163, 196, 197, 198, 199

UNITED STATES PATENT OFFICE
CERTIFICATE OF CORRECTION

Patent No. 3,516,979                    Dated  June 23, 1970

Inventor(s)  JACKY DORE and REINHARD NEIER     Page 1

It is certified that error appears in the above-identified patent and that said Letters Patent are hereby corrected as shown below:

Column 1, line 15, "1:1" should read --1:2--; line 34, after the formula, insert --(I)--; line 72, after the formula, insert --(IV)--. Column 2, line 20, after the formula, insert a comma --,--; line 21, after the formula, insert a comma --,--; line 23, after the formula, insert a period --.--; line 38, "-amino," should read -- -amino-,--. Column 4, line 50, after the formula, insert a comma --,--. Column 5, in the table, in Example No. 13, column (I), "→1-hydrosy" should read --→1-hydroxy--. Column 6, line 6, "$(SO_4)^2$" should read --$(SO_4)_2$--; line 22, "solvents'" should read --solvents,--; line 26, "lacquers'" should read --lacquers,--; line 30, "-nitrophenylazo-" should read -- -nitrophenylazo)- --; in the table, in Example No. 12, column (II), "nigrobenzene" should read --nitrobenzene--. Column 7, in the table, in column (I), Example No. 16, "2-amino-2-" should read --2-amino-1- --; Example No. 21, "cid" should read --acid--; Example No. 24, "→1" should read --→1- --. Column 8, in the table, in column (II), Example No. 31, "chlorobenzene→2" should read --chlorobenzene→2- --; Example No. 32, change "2-amino-1-hydroxy-4-chlorobenzene→2-hydroxynaphthalene." to -- -----do------------------------------------------ --; line 73, "dissolving" should read --by dissolving--. Column 9, line 12, in the formula, line 21, in the formula,

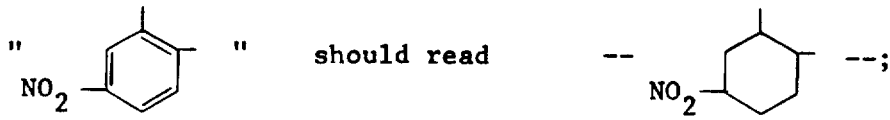

line 74, in the formula,

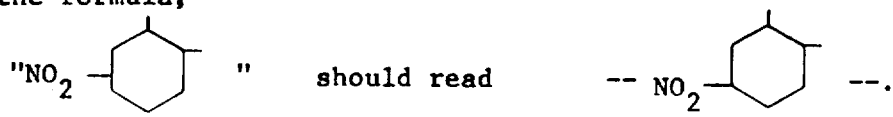

UNITED STATES PATENT OFFICE
CERTIFICATE OF CORRECTION

Patent No. 3,516,979      Dated June 23, 1970

Inventor(s) JACKY DORE and REINHARD NEIER    Page 2

It is certified that error appears in the above-identified patent and that said Letters Patent are hereby corrected as shown below:

Column 10, line 46, in the formula,

" 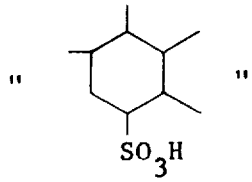 "     should read     -- 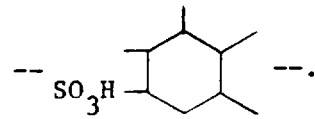 --.

Column 11, line 40, "1:1" should read --1:2--; line 55, in the formula,

     should read     -- 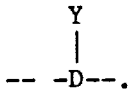 --.

"-C"     should read     -- -D--.

Column 12, line 5, "benzylamino" should read --benzoylamino--; line 13, after the formula insert a comma --,--. Column 13, line 70, in the formula, " 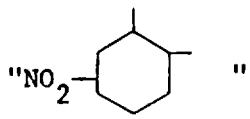 "     should read     -- 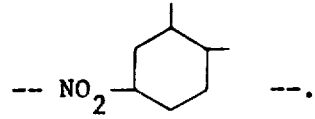 --.

SIGNED AND
SEALED
NOV 24 1970

(SEAL)
Attest:

Edward M. Fletcher, Jr.

Attesting Officer

WILLIAM E. SCHUYLER, JR.
Commissioner of Patents